(12) United States Patent
Eleftheriadis et al.

(10) Patent No.: US 8,693,538 B2
(45) Date of Patent: Apr. 8, 2014

(54) SYSTEM AND METHOD FOR PROVIDING ERROR RESILIENCE, RANDOM ACCESS AND RATE CONTROL IN SCALABLE VIDEO COMMUNICATIONS

(75) Inventors: Alexandros Eleftheriadis, New York, NY (US); Danny Hong, New York, NY (US); Ofer Shapiro, Fair Lawn, NJ (US); Thomas Wiegand, Berlin (DE)

(73) Assignee: Vidyo, Inc., Hackensack, NJ (US)

( * ) Notice: Subject to any disclaimer, the term of this patent is extended or adjusted under 35 U.S.C. 154(b) by 1651 days.

(21) Appl. No.: 11/682,263

(22) Filed: Mar. 5, 2007

(65) Prior Publication Data
US 2007/0230566 A1  Oct. 4, 2007

Related U.S. Application Data

(60) Provisional application No. 60/778,760, filed on Mar. 3, 2006, provisional application No. 60/787,031, filed on Mar. 29, 2006, provisional application No. 60/862,510, filed on Oct. 23, 2006, provisional application No. 60/884,148, filed on Jan. 9, 2007, provisional application No. 60/786,997, filed on Mar. 29, 2006, provisional application No. 60/829,609, filed on Oct. 16, 2006.

(51) Int. Cl.
*H04B 1/66* (2006.01)

(52) U.S. Cl.
USPC .................. 375/240.12; 375/240; 375/240.01

(58) Field of Classification Search
USPC ................................ 375/240.12, 240, 240.01
See application file for complete search history.

(56) References Cited

U.S. PATENT DOCUMENTS

| | | | |
|---|---|---|---|
| 5,555,244 A | 9/1996 | Gupta et al. | |
| 6,148,005 A | 11/2000 | Paul et al. | |
| 6,167,084 A | 12/2000 | Wang et al. | |
| 6,498,865 B1 | 12/2002 | Brailean et al. | |
| 6,580,754 B1 * | 6/2003 | Wan et al. | 375/240.01 |
| 6,771,703 B1 * | 8/2004 | Oguz et al. | 375/240.03 |
| 6,871,006 B1 * | 3/2005 | Oguz et al. | 386/346 |
| 6,909,753 B2 * | 6/2005 | Meehan et al. | 375/240.27 |
| 6,912,584 B2 | 6/2005 | Wang et al. | |

(Continued)

FOREIGN PATENT DOCUMENTS

| | | |
|---|---|---|
| CA | 2507825 | 9/2004 |
| CA | 2515354 | 9/2004 |
| WO | WO03/063505 | 7/2003 |

OTHER PUBLICATIONS

U.S. Appl. No. 11/608,776, filed Dec. 8, 2006.

(Continued)

*Primary Examiner* — Bradley Holder
(74) *Attorney, Agent, or Firm* — Baker Botts L.L.P.

(57) ABSTRACT

Systems and methods for error resilient transmission, rate control, and random access in video communication systems that use scalable video coding are provided. Error resilience is obtained by using information from low resolution layers to conceal or compensate loss of high resolution layer information. The same mechanism is used for rate control by selectively eliminating high resolution layer information from transmitted signals, which elimination can be compensated at the receiver using information from low resolution layers. Further, random access or switching between low and high resolutions is also achieved by using information from low resolution layers to compensate for high resolution spatial layer packets that may have not been received prior to the switching time.

27 Claims, 10 Drawing Sheets

VIDEOCONFERENCING SYSTEM

(56) References Cited

U.S. PATENT DOCUMENTS

| | | | |
|---|---|---|---|
| 6,937,770 B1* | 8/2005 | Oguz et al. | 382/235 |
| 6,959,116 B2* | 10/2005 | Sezer et al. | 382/251 |
| 6,973,622 B1 | 12/2005 | Rappaport et al. | |
| 7,146,056 B2* | 12/2006 | Klein Gunnewiek et al. | 382/236 |
| 7,359,558 B2* | 4/2008 | Klein Gunnewiek et al. | 382/236 |
| 7,400,889 B2* | 7/2008 | Balasubramanian et al. | 455/452.2 |
| 7,421,127 B2* | 9/2008 | Bruls et al. | 382/232 |
| 7,643,560 B2 | 1/2010 | Hong et al. | |
| 2001/0036321 A1 | 11/2001 | Kishi | |
| 2002/0018484 A1 | 2/2002 | Kim | |
| 2002/0057898 A1 | 5/2002 | Normile | |
| 2002/0071485 A1* | 6/2002 | Caglar et al. | 375/240.01 |
| 2002/0163918 A1 | 11/2002 | Cline | |
| 2003/0012279 A1 | 1/2003 | Chaddha | |
| 2003/0074674 A1 | 4/2003 | Magliaro et al. | |
| 2003/0086622 A1* | 5/2003 | Klein Gunnewiek et al. | 382/240 |
| 2003/0103571 A1* | 6/2003 | Meehan et al. | 375/240.27 |
| 2003/0118243 A1* | 6/2003 | Sezer et al. | 382/245 |
| 2003/0126238 A1 | 7/2003 | Kohno et al. | |
| 2003/0133500 A1* | 7/2003 | Auwera et al. | 375/240.11 |
| 2003/0135631 A1 | 7/2003 | Li et al. | |
| 2003/0138043 A1 | 7/2003 | Hannuksela | |
| 2004/0001479 A1 | 1/2004 | Pounds et al. | |
| 2004/0042549 A1 | 3/2004 | Huang et al. | |
| 2004/0071354 A1 | 4/2004 | Adachi et al. | |
| 2004/0198371 A1* | 10/2004 | Balasubramanian et al. | 455/452.2 |
| 2004/0218816 A1 | 11/2004 | Hannuksela | |
| 2004/0252767 A1* | 12/2004 | Bruls et al. | 375/240.21 |
| 2004/0252900 A1* | 12/2004 | Bruls | 382/240 |
| 2004/0252901 A1* | 12/2004 | Klein Gunnewiek et al. | 382/240 |
| 2004/0258319 A1* | 12/2004 | Bruls | 382/240 |
| 2005/0002458 A1* | 1/2005 | Bruls et al. | 375/240.21 |
| 2005/0018771 A1* | 1/2005 | Bourge et al. | 375/240.16 |
| 2005/0105814 A1* | 5/2005 | Bruls et al. | 382/240 |
| 2005/0135477 A1 | 6/2005 | Zhang et al. | |
| 2005/0147164 A1 | 7/2005 | Wu et al. | |
| 2005/0163211 A1* | 7/2005 | Shanableh | 375/240.1 |
| 2005/0254575 A1 | 11/2005 | Hannuksela et al. | |
| 2005/0259729 A1* | 11/2005 | Sun | 375/240.1 |
| 2005/0265450 A1 | 12/2005 | Raveendran et al. | |
| 2006/0010269 A1* | 1/2006 | Leibbrandt | 710/74 |
| 2006/0078049 A1 | 4/2006 | Bao et al. | |
| 2006/0227871 A1 | 10/2006 | Budagavi | |
| 2006/0282737 A1 | 12/2006 | Shi et al. | |
| 2007/0071090 A1 | 3/2007 | Peng et al. | |
| 2007/0086521 A1 | 4/2007 | Wang et al. | |
| 2010/0067579 A1 | 3/2010 | Bandoh et al. | |
| 2010/0132002 A1 | 5/2010 | Henocq et al. | |
| 2010/0189181 A1 | 7/2010 | Zheng et al. | |

OTHER PUBLICATIONS

U.S. Appl. No. 11/971,769, filed Jan. 9, 2008.
Eleftheriadis, et al., "SVC Error Resil Using Frame Index in NAL Unit Header", *ITU Study Group 16—Video Coding Experts Group—ISO/IEC MPEG & ITU-T VCEG,* No. JVT-V088, Jan. 10, 2007, XP030006896, Entire document.
Eleftheriadis, et al., "Improved Error Resilience Using Temporal Level 0 Picture Index", *ITU Study Group—16 Video Coding Experts Group—ISO/IEC MPEG & ITU-T VCEG,* No. JVT-W062, Apr. 27, 2007, XP030007022, Entire document.
Schwarz et al., "Overview of the Scalable Extension of the H.264/MPEG-4 AVC Video Coding Standard", Oct. 6, 2006, XP008108972.
(ITU-T H.264) "ITU-T Recommendation H.264: Advanced Video Coding for Generic Audiovisual Services "in: International Relecommunication Union (On Line, {URL: http://www.itu.intlrec/TRec-H.264/en} 03/0 112005 entire document.
Weigand, et al., "Joint Scalable Vidoe Model 8: Joint Draft 8 with Proposed Changes", *ITU Study Group 16—Video Coding Experts Group—ISO/IEC MPEG & ITU-T VCEG,* No. JVT-U202, Dec. 13, 2006, XP030006800 (paragraphs [G.7.3.1], [G.7.4.1]-[G7.4.2]).
Hannuksela, et al., "H.264/AVC in Wireless Enviroments", *IEEE Transactions on Circuits and Systems, for Video Technology, IEE Service Center,* vol. 13, No. 7, Jul. 1, 2003, pp. 657-673, XP011099258.
European Search Report issued on Aug. 3, 2010 in application No. EP08705806.1 (corresponding to US US20080165864A1).
U.S. Appl. No. 13/018,853, filed Feb. 1, 2011.
International Search Report and Written Opinion for PCT/US2011/023327 dated Mar. 28, 2011.
Partial European Search Report issued on Mar. 24, 2011 in application No. EP07757937.
JVT: "Joint Scalable Video Model JSVM4"; ITU Study Group 16—Video Coding Experts Group—ISO/IEC MPEG & ITU-T VCEG (ISO/IEC JTC1/SC29/WG11 and ITU-T SG 16 Q6), Document No. JVT-Q202, Nov. 18, 2005; Paragraphs [01.1], [02.1], [2.2], [0004]; XP030006256.
Chen et al., "SVC Frame Loss Concealment", ITU Study Group 16—Video Coding Experts Group-ISO/IEC MPEG & ITU-T VCEG (ISO/IEC JTC1/SC29/WG11 and ITU-T SG 16 Q6), Document No. JVT-Q046, Oct. 12, 2005; XP030006207.
Tian V Kumar MV Tampere International CTR for Signal Processing (Finland) D et al.; "Improved H.264/AVC Video Broadcast/Multicast", Visual Communications and Image Processing; Jul. 15, 2005; XP030080844.
U.S. Appl. No. 13/209,023, filed Aug. 12, 2011.
U.S. Appl. No. 13/238,624, filed Sep. 21, 2011.
U.S. Appl. No. 11/608,776, Feb. 27, 2012 Response to Non-Final Office Action.
U.S. Appl. No. 11/608,776, Oct. 27, 2011 Non-Final Office Action.
European Office Action for EP 08705806.1, dated Mar. 25, 2013.
Wenger, et al., "Extended RTP Profile for Real-Time Transport Control Protocol (RTCP)—Based Feedback (RTP/AVPF)", *J. Ott Helsinki University of Technology,* whole document (52 pages) (Jul. 1, 2006) (XP015055018).
Wenger, et al., "RTP Payload Format for H.264 Video", *RFC 3984,* pages 34-47 (Feb. 1, 2005) (XP008135986).
Wenger, "Video Redundancy Coding in H.263+", *Proceedings AVSPN,* pp. 1-6, (1997) (XP002966435).
Hartung, et al., "A Real-time Scalable Software Video Codec for Collaborative Applications Over Packet Networks", *ACM Multimedia Communications* '98, Bristol, UK, pp. 419-426 (1998).
Ohm, "Advances in Scalable Video coding", *Proceedings of the IEEE,* 93(1):42-56 (2005).

* cited by examiner

FIG. 1: VIDEOCONFERENCING SYSTEM

FIG. 4: PICTURE CODING STRUCTURE
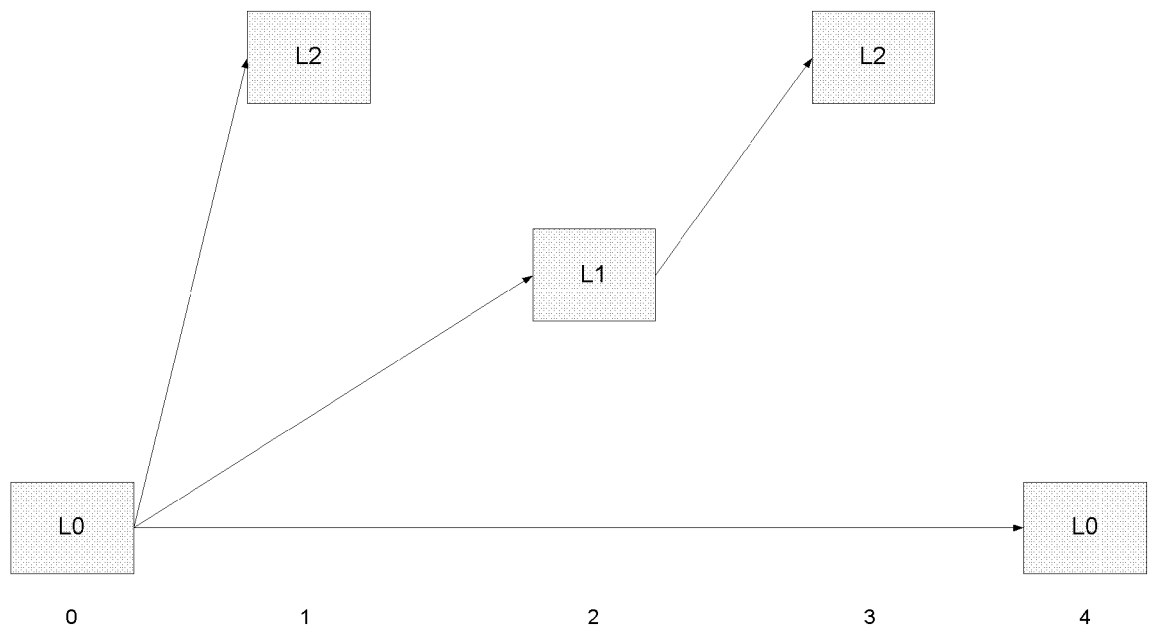

FIG. 5: ALTERNATIVE PICTURE CODING STRUCTURE EXAMPLE
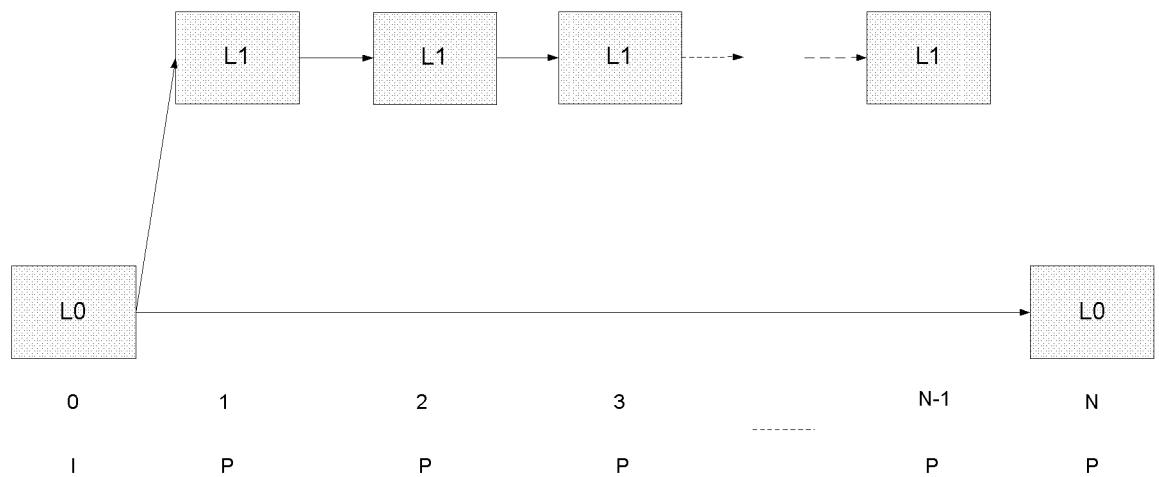

FIG. 6: SPATIAL SCALABILITY ENHANCEMENT LAYER CODEC
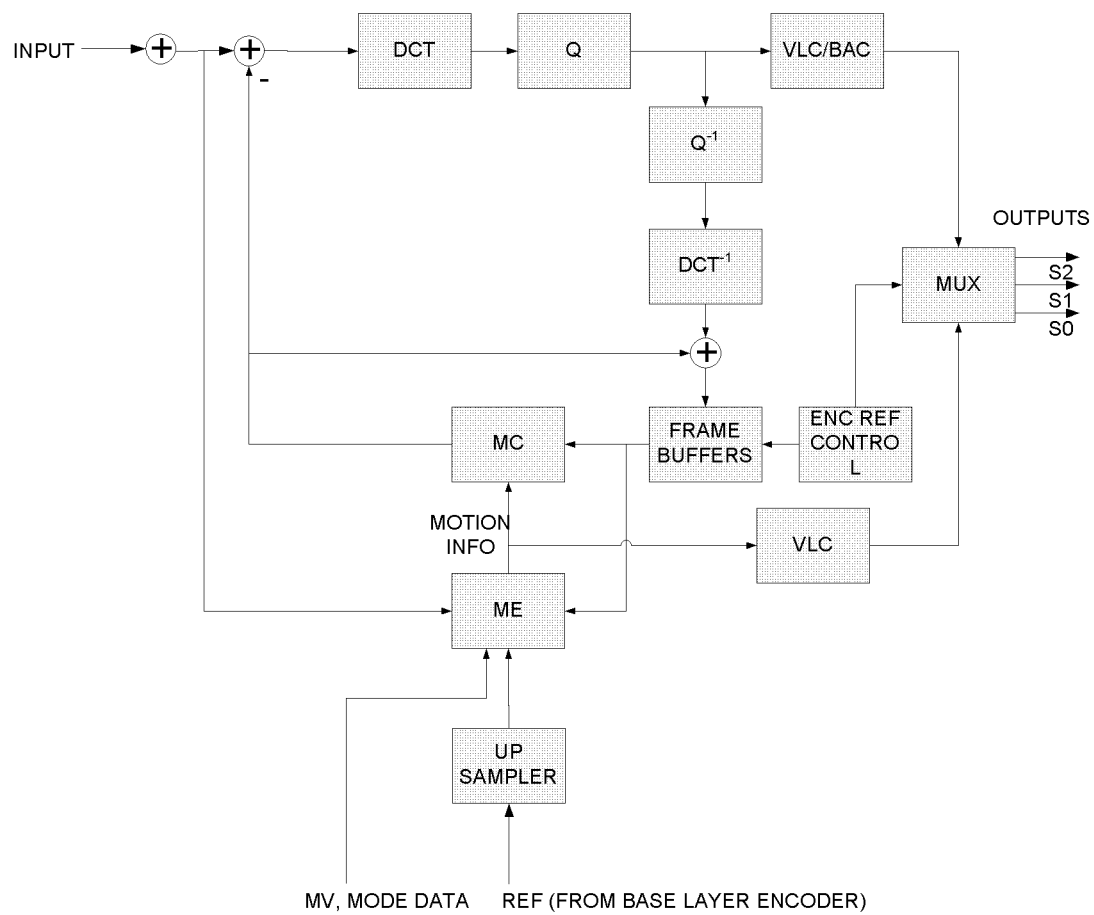

FIG. 7: PICTURE CODING STRUCTURE FOR SPATIAL SCALABILITY
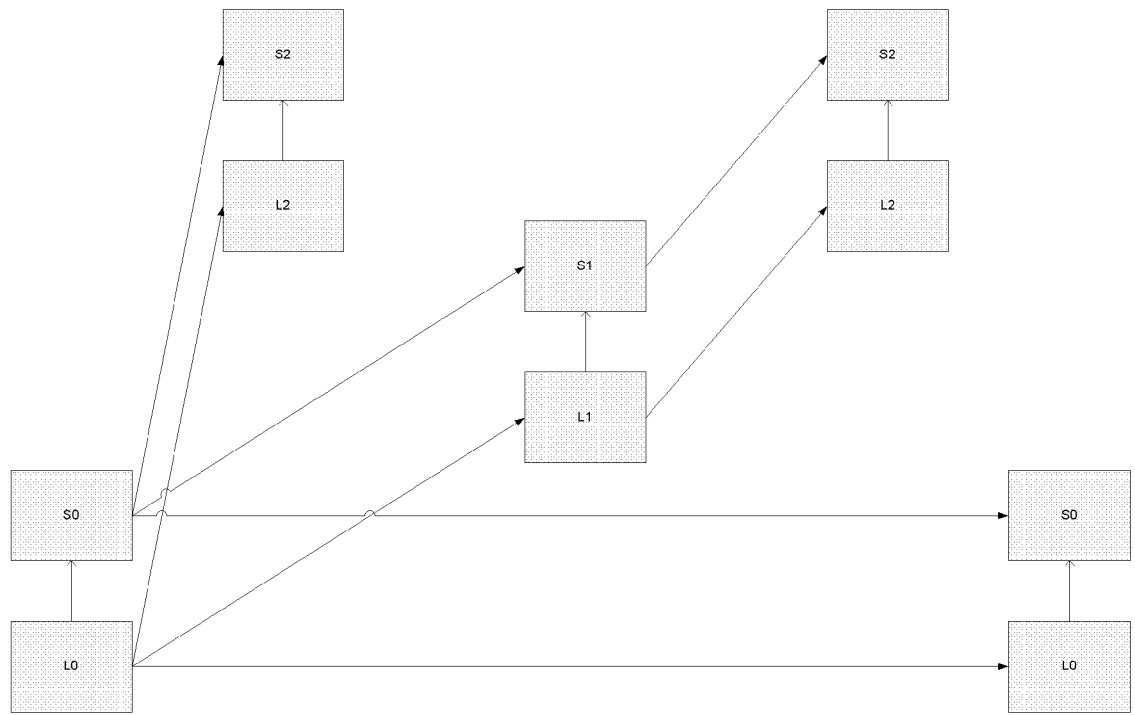

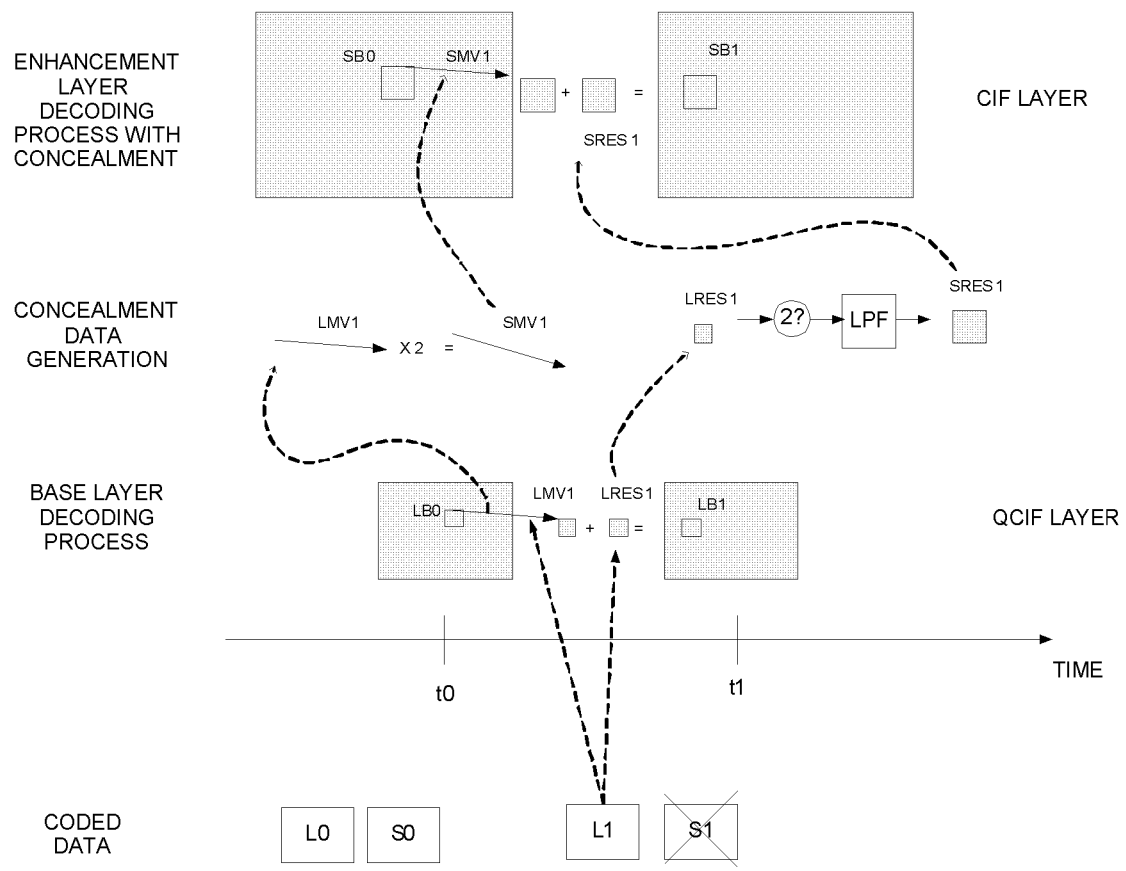
FIG. 8: CONCEALMENT PROCESS

FIG. 9: R-D CURVES OF CONCEALMENT PROCESS FOR 'FOREMAN' VIDEO SEQUENCE
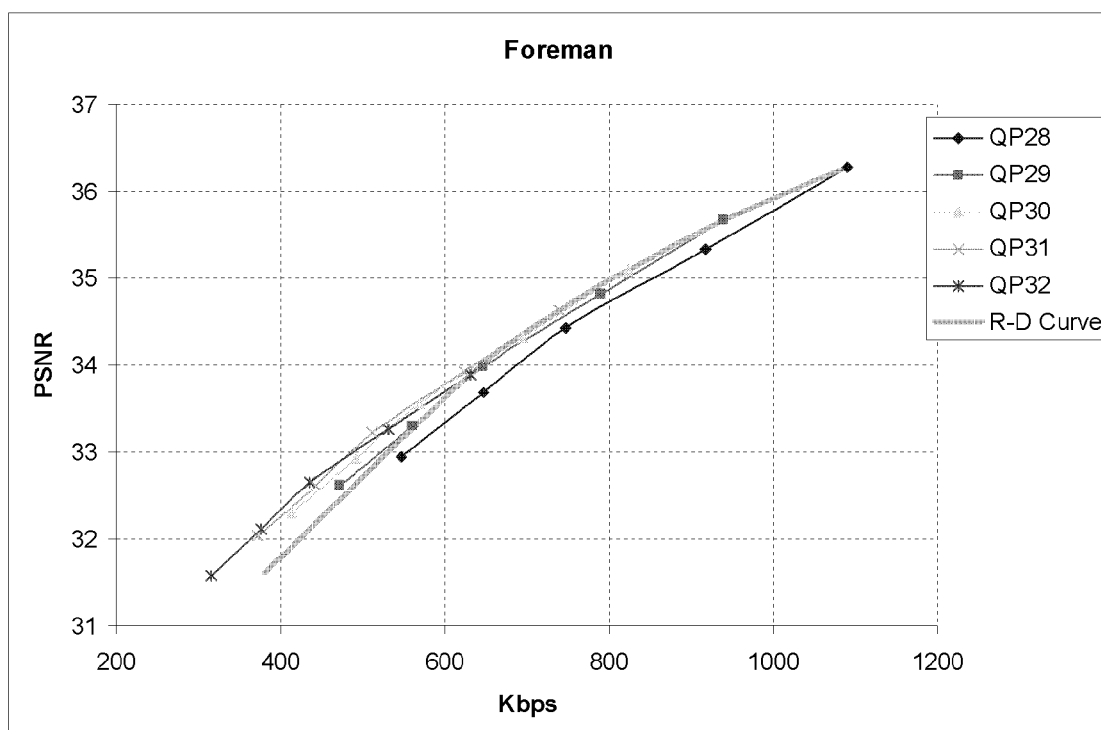

FIG. 10: PICTURE CODING STRUCTURE FOR SPATIAL SCALABILITY WITH SR PICTURES
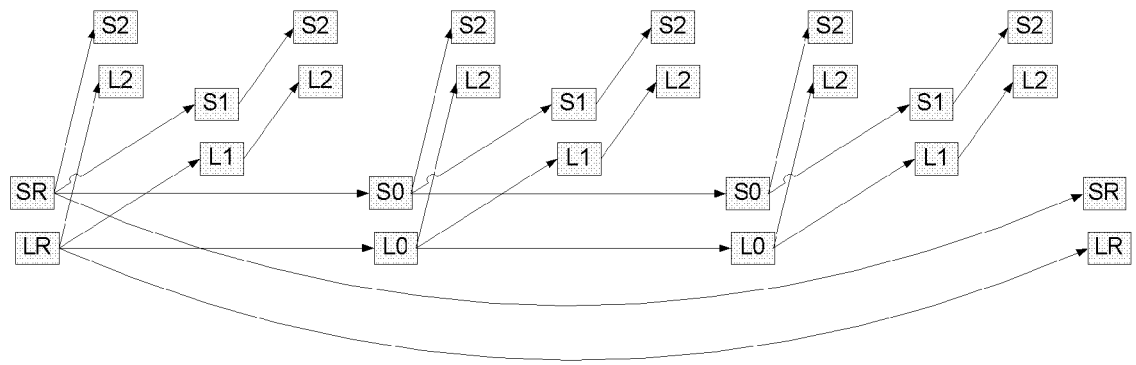

SYSTEM AND METHOD FOR PROVIDING ERROR RESILIENCE, RANDOM ACCESS AND RATE CONTROL IN SCALABLE VIDEO COMMUNICATIONS

CROSS-REFERENCE TO RELATED APPLICATIONS

This application claims the benefit of U.S. provisional patent application Ser. No. 60/778,760, filed Mar. 3, 2006, of provisional patent application Ser. No. 60/787,031, filed Mar. 29, 2006, and of provisional patent application Ser. No. 60/862,510 filed Oct. 23, 2006. Further, this application is claims the benefit of related International patent application Nos. PCT/US06/28365, PCT/US06/028366, PCT/US06/028367, PCT/US06/028368, PCT/US06/061815, PCT/US06/62569, and PCT/US07/62357, and U.S. provisional patent application Nos. 60/884,148 filed Jan. 9, 2007, 60/786,997 filed Mar. 29, 2006, and 60/829,609 filed Oct. 16, 2006. All of the aforementioned priority and related applications, which are commonly assigned, are hereby incorporated by reference herein in their entireties.

FIELD OF THE INVENTION

The present invention relates to video data communication systems. The invention specifically relates to simultaneously providing error resilience, random access, and rate control capabilities in video communication systems utilizing scalable video coding techniques.

BACKGROUND OF THE INVENTION

Transmission of digital video on packet-based networks such as those based on the Internet Protocol (IP) is extremely challenging, at least due to the fact that data transport is typically done on a best-effort basis. In modern packet-based communication systems errors typically exhibit themselves as packet losses and not bit errors. Furthermore, such packet losses are typically the result of congestion in intermediary routers, and not the result of physical layer errors (one exception to this is wireless and cellular networks). When an error in transmission or receipt of a video signal occurs, it is important to ensure that the receiver can quickly recover from the error and return to an error-free display of the incoming video signal. However, in typical digital video communication systems, the receiver's robustness is reduced by the fact that the incoming data is heavily compressed in order to conserve bandwidth. Further, the video compression techniques employed in the communication systems (e.g., state-of-the-art codecs ITU-T H.264 and H.263 or ISO MPEG-2 and MPEG-4 codecs) can create a very strong temporal dependency between sequential video packets or frames. In particular, use of motion compensated prediction (e.g., involving the use of P or B frames) codecs creates a chain of frame dependencies in which a displayed frame depends on past frame(s). The chain of dependencies can extend all the way to the beginning of the video sequence. As a result of the chain of dependencies, the loss of a given packet can affect the decoding of a number of the subsequent packets at the receiver. Error propagation due to the loss of the given packet terminates only at an "intra" (I) refresh point, or at a frame that does not use any temporal prediction at all.

Error resilience in digital video communication systems requires having at least some level of redundancy in the transmitted signals. However, this requirement is contrary to the goals of video compression techniques, which strive to eliminate or minimize redundancy in the transmitted signals.

On a network that offers differentiated services (e.g., Diff-Serv IP-based networks, private networks over leased lines, etc.), a video data communication application may exploit network features to deliver some or all of video signal data in a lossless or nearly lossless manner to a receiver. However, in an arbitrary best-effort network (such as the Internet) that has no provision for differentiated services, a data communication application has to rely on its own features for achieving error resilience. Known techniques (e.g., the Transmission Control Protocol—TCP) that are useful in generic data communications are not appropriate for video or audio communications, which have the added constraint of low end-to-end delay arising out of human interface requirements. For example, TCP techniques may be used for error resilience in data transport using the File Transfer Protocol. TCP keeps on retransmitting data until confirmation that all data is received, even if it involves a delay is several seconds. However, TCP is inappropriate for video data transport in a live or interactive videoconferencing application because the end-to-end delay, which is unbounded, would be unacceptable to participants.

A related problem is that of random access. Assume that a receiver joins an existing transmission of a video signal. Typical instances are when a user who joins a videoconference, or a user who tunes in to a broadcast. Such a user would have to find a point in the incoming bitstream where he/she can start decoding and be in synchronization with the encoder. Providing such random access points, however, has a considerable impact on compression efficiency. Note that a random access point is, by definition, an error resilience feature since at that point any error propagation terminates (i.e., it is an error recovery point). Hence, the better the random access support provided by a particular coding scheme, the faster error recovery the coding scheme can provide. The converse may not always be true; it depends on the assumptions made about the duration and extent of the errors that the error resilience technique has been designed to address. For error resilience, some state information could be assumed to be available at the receiver at the time the error occurred.

As an example, in MPEG-2 video codecs for digital television systems (digital cable TV or satellite TV), I pictures are used at periodic intervals (typically 0.5 sec) to enable fast switching into a stream. The I pictures, however, are considerably larger than their P or B counterparts (typically by 3-6 times) and are thus to be avoided, especially in low bandwidth and/or low delay applications.

In interactive applications such as videoconferencing, the concept of requesting an intra update is often used for error resilience. In operation, the update involves a request from the receiver to the sender for an intra picture transmission, which enables the decoder to be synchronized. The bandwidth overhead of this operation is significant. Additionally, this overhead is also incurred when packet errors occur. If the packet losses are caused by congestion, then the use of the intra pictures only exacerbates the congestion problem.

Another traditional technique for error resilience, which has been used in the past (e.g., in the H.261 standard) to mitigate drift caused by mismatch in IDCT implementations, is to periodically code each macroblock in intra mode. The H.261 standard requires forced intra coding every 132 times a macroblock is transmitted.

The coding efficiency decreases with increasing percentage of macroblocks that are forced to be coded as intra in a given frame. Conversely, when this percentage is low, the time to recover from a packet loss increases. The forced intra coding process requires extra care to avoid motion-related drift, which further limits the encoder's performance since some motion vector values have to be avoided, even if they are the most effective.

In addition to traditional, single-layer codecs, layered or scalable coding is a well-known technique in multimedia data encoding. Scalable coding is used to generate two or more "scaled" bitstreams collectively representing a given medium in a bandwidth-efficient manner. Scalability can be provided in a number of different dimensions, namely temporally, spatially, and quality (also referred to as SNR "Signal-to-Noise Ratio" scalability or fidelity scalability). For example, a video signal may be scalably coded in different layers at CIF and QCIF resolutions, and at frame rates of 7.5, 15, and 30 frames per second (fps). Depending on the codec's structure, any combination of spatial resolutions and frame rates may be obtainable from the codec bitstream. The bits corresponding to the different layers can be transmitted as separate bitstreams (i.e., one stream per layer) or they can be multiplexed together in one or more bitstreams. For convenience in description herein, the coded bits corresponding to a given layer may be referred to as that layer's bitstream, even if the various layers are multiplexed and transmitted in a single bitstream. Codecs specifically designed to offer scalability features include, for example, MPEG-2 (ISO/IEC 13818-2, also known as ITU-T H.262) and the currently developed SVC (known as ITU-T H.264 Annex G or MPEG-4 Part 10 SVC). Scalable coding techniques specifically designed for video communication are described in commonly assigned international patent application No. PCT/US06/028365, "SYSTEM AND METHOD FOR SCALABLE AND LOW-DELAY VIDEOCONFERENCING USING SCALABLE VIDEO CODING". It is noted that even codecs that are not specifically designed to be scalable can exhibit scalability characteristics in the temporal dimension. For example, consider an MPEG-2 Main Profile codec, a non-scalable codec, which is used in DVDs and digital TV environments. Further, assume that the codec is operated at 30 fps and that a group of pictures (GOP) structure of IBBPBBPBBPBBPBB (period N=15 frames) is used. By sequential elimination of the B pictures, followed by elimination of the P pictures, it is possible to derive a total of three temporal resolutions: 30 fps (all picture types included), 10 fps (I and P only), and 2 fps (I only). The sequential elimination process results in a decodable bitstream because the MPEG-2 Main Profile codec is designed so that coding of the P pictures does not rely on the B pictures, and similarly coding of the I pictures does not rely on other P or B pictures. In the following, single-layer codecs with temporal scalability features are considered to be a special case of scalable video coding, and are thus included in the term scalable video coding, unless explicitly indicated otherwise.

Scalable codecs typically have a pyramidal bitstream structure in which one of the constituent bitstreams (called the "base layer") is essential in recovering the original medium at some basic quality. Use of one or more the remaining bitstream(s) (hereinafter called "the enhancement layer(s)") along with the base layer increases the quality of the recovered medium. Data losses in the enhancement layers may be tolerable, but data losses in the base layer can cause significant distortions or complete loss of the recovered medium.

Scalable codecs pose challenges similar to those posed by single layer codecs for error resilience and random access. However, the coding structures of the scalable codecs have unique characteristics that are not present in single layer video codecs. Further, unlike single layer coding, scalable coding may involve switching from one scalability layer to another (e.g., switching back and forth between CIF and QCIF resolutions). Instantaneous layer switching when switching between different resolutions with very little bit rate overhead is desirable for random access in scalable coding systems in which multiple signal resolutions (spatial/temporal/quality) may be available from the encoder.

A problem related to those of error resilience and random access is that of rate control. The output of a typical video encoder has a variable bit rate, due to the extensive use of prediction, transform and entropy coding techniques. In order to construct a constant bit rate stream, buffer-constrained rate control is typically employed in a video communication system. In such a system, an output buffer at the encoder is assumed, which is emptied at a constant rate (the channel rate); the encoder monitors the buffer's occupancy and makes parameter selections (e.g., quantizer step size) in order to avoid buffer overflow or underflow. Such a rate control mechanism, however, can only be applied at the encoder, and further assumes that the desired output rate is known. In some video communication applications, including videoconferencing, it is desirable that such rate control decisions are made at an intermediate gateway (e.g., at a Multipoint Control Unit—MCU), which is situated between the sender and the receiver. Bitstream-level manipulation, or transcoding, can be used at the gateway, but at considerable processing and complexity cost. It is therefore desirable to employ a technique that achieves rate control without requiring any additional processing at the intermediate gateway.

Consideration is now being given to improving error resilience and capabilities for random access to the coded bitstreams, and rate control in video communications systems. Attention is directed developing error resilience, rate control, and random access techniques, which have a minimal impact on end-to-end delay and the bandwidth used by the system.

SUMMARY OF THE INVENTION

The present invention provides systems and methods to increase error resilience and provide random access and rate control capabilities in video communication systems that use scalable video coding. The systems and methods also allow the derivation of an output signal at a resolution different than the coded resolutions, with excellent rate-distortion performance.

In one embodiment, the present invention provides a mechanism to recover from loss of packets of a high resolution spatially scalable layer by using information from the low resolution spatial layer. In another embodiment, the present invention provides a mechanism to switch from a low spatial or SNR resolution to a high spatial or SNR resolution with little or no delay. In yet another embodiment, the present invention provides a mechanism for performing rate control, in which the encoder or an intermediate gateway (e.g., an MCU) selectively eliminates packets from the high resolution spatial layer, anticipating the use of appropriate error recovery mechanisms at the receiver that minimize the impact of the lost packets on the quality of the received signal. In yet another embodiment, the encoder or an intermediate gateway selectively replaces packets from the high resolution spatial layer with information that effectively instructs the encoder to reconstruct an approximation to the high resolution data being replaced using information from the base layer and past frames of the enhancement layer. In another embodiment, the present invention describes a mechanism for deriving an output video signal at a resolution different than the coded resolutions, and specifically an intermediate resolution between those used for spatially scalable coding. These embodiments, either alone or in combination, allow the construction of video communication systems with significant rate control and resolution flexibility as well as error resilience and random access.

The inventive systems and methods are based on "error concealment" techniques in conjunction with scalable coding techniques. The techniques simultaneously achieve error resilience and rate control for a particular family of video encoders referred to as scalable video encoders. The rate-distortion performance of the error concealment techniques is such that it matches or exceeds that of coding at the effective transfer rate (total transmitted minus the rate of the lost packets). By appropriate selection of picture coding structures and transport modes the techniques allow nearly instantaneous layer switching with very little bit rate overhead.

Further, the techniques can be used to derive a decoded version of the received signal at a resolution different than the coded resolution(s). This allows, for example, the creation of a ½ CIF (HCIF) signal out of a spatially scalable coded signal at QCIF and CIF resolutions. In contrast with typical scalable coding, the receiver would either have to use the QCIF signal and upsample it (with poor quality), or use the CIF signal and downsample it (with good quality but high bit rate utilization). The same problem also exists if the QCIF and CIF are simulcast as single-layer streams.

The techniques also provide rate control with minimal processing of the encoded video bitstream without adversely affecting picture quality.

BRIEF DESCRIPTION OF THE DRAWINGS

Further features, the nature, and various advantages of the invention will be more apparent from the following detailed description of the preferred embodiments and the accompanying drawings in which:

FIG. 4 is a diagram illustrating an exemplary picture coding structure in accordance with the principles of the present invention;

FIG. 5 is a diagram illustrating an example of an alternative picture coding structure in accordance with the principles of the present invention;

FIG. 6 is a block diagram illustrating an exemplary architecture of a video encoder for a spatial enhancement layer in accordance with the principles of the present invention;

FIG. 7 is a diagram illustrating an exemplary picture coding structure when spatial scalability is used in accordance with the principles of the present invention;

FIG. 8 is a diagram illustrating an exemplary decoding process with concealment of enhancement layer pictures in accordance with the principles of the present invention;

FIG. 9 is a diagram illustrating exemplary R-D curves of the concealment process when applied to the 'Foreman' sequence in accordance with the principles of the present invention;

FIG. 10 is a diagram illustrating an exemplary picture coding structure when spatial scalability with SR pictures is used in accordance with the principles of the present invention.

Figure 1:
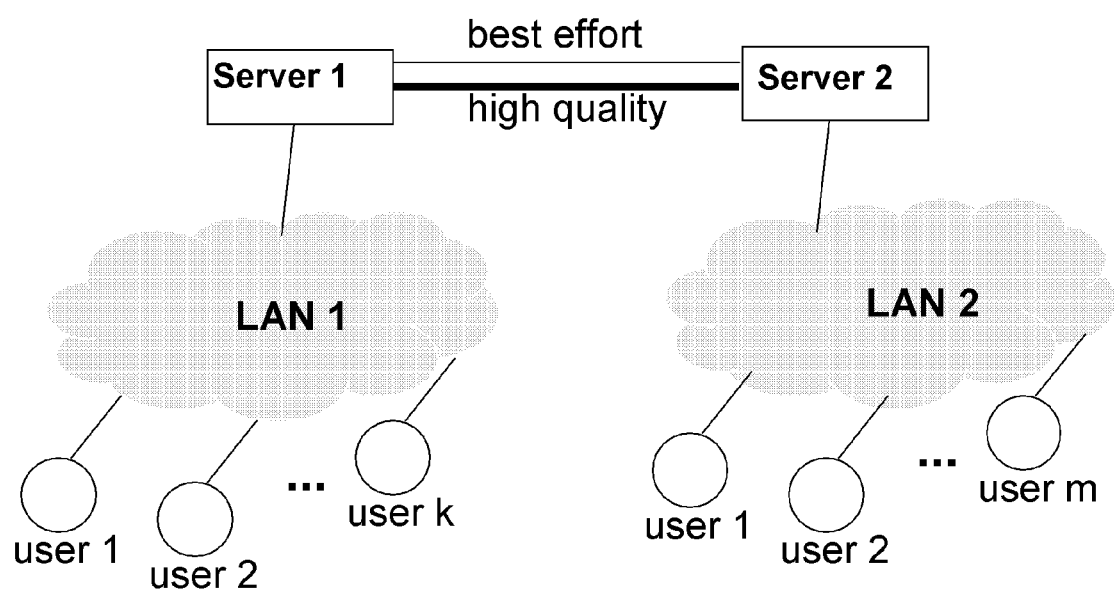
FIG. 1 is a block diagram illustrating the overall architecture of a videoconferencing system in accordance with the principles of the present invention.

Throughout the Figures the same reference numerals and characters, unless otherwise stated, are used to denote like features, elements, components or portions of the illustrated embodiments. Moreover, while the present invention will now be described in detail with reference to the Figures, it is done so in connection with the illustrative embodiments.

DETAILED DESCRIPTION OF THE INVENTION

Systems and methods are provided for error resilient transmission, random access and rate control in video communication systems. The systems and methods exploit error concealment techniques based on features of scalable video coding, which may be used in the video communication systems.

In a preferred embodiment, an exemplary video communication system may be a multi-point videoconferencing system 10 operated over a packet-based network. (See e.g., FIG. 1). Multi-point videoconferencing system may include optional bridges 120a and 120b (e.g., Multipoint Control Unit (MCU) or Scalable Video Communication Server (SVCS)) to mediate scalable multilayer or single layer video communications between endpoints (e.g., users 1-k and 1-m) over the network. The operation of the exemplary video communication system is the same and as advantageous for a point-to-point connection with or without the use of optional bridges 120a and 120b. The techniques described in this invention can be applied directly to all other video communication applications, including point-to-point streaming, broadcasting, multicasting, etc.

A detailed description of scalable video coding techniques and videoconferencing systems based on scalable video coding is provided, for example, in commonly assigned International patent application Nos. PCT/US06/28365 and PCT/US06/28366. Further, descriptions of scalable video coding techniques and videoconferencing systems based on scalable video coding are provided in commonly assigned International patent application Nos. PCT/US06/62569 and PCT/US06/061815.

FIG. 1 shows the general structure of a videoconferencing system 10. Videoconferencing system 10 includes a plurality of end-user terminals (e.g., users 1-k and users 1-m) that are linked over a network 100 via LANs 1 and 2 and servers 120a and 120b. The servers may be traditional MCUs, or Scalable Video Coding servers (SVCS) or Compositing Scalable Video Coding servers (CSVCS). The latter servers have the same purpose as traditional MCUs, but with significantly reduced complexity and improved functionality. (See e.g., International patent application Nos. PCT/US06/28366 and PCT/US06/62569). In the description herein, the term "server" may be used generically to refer to either an SVCS or an CSVCS.

Figure 2:
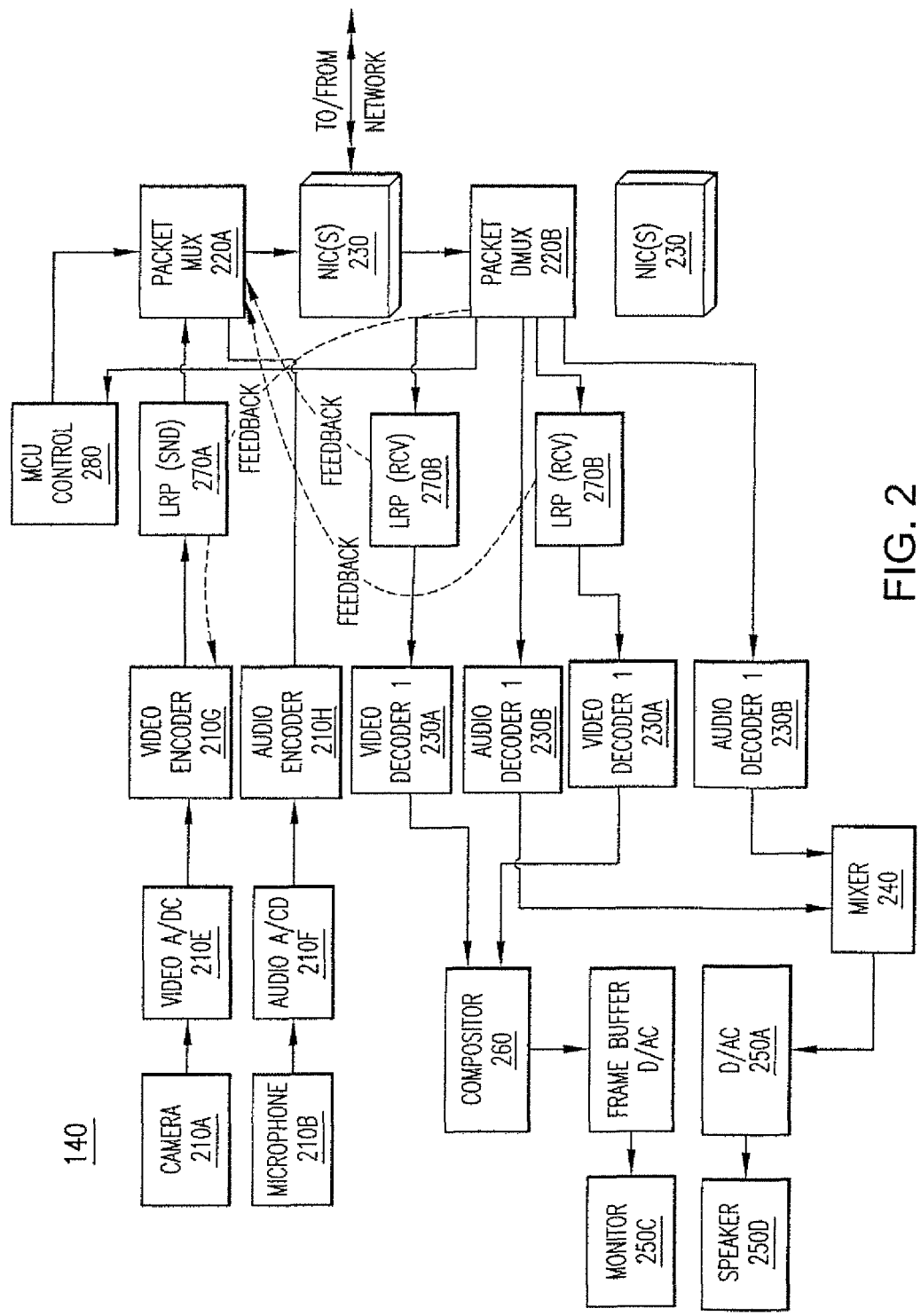
FIG. 2 is a block diagram illustrating an exemplary end-user terminal in accordance with the principles of the present invention.

FIG. 2 shows the architecture of an end-user terminal 140, which is designed for use with videoconferencing systems (e.g., system 100) based on multi layer coding. Terminal 140 includes human interface input/output devices (e.g., a camera 210A, a microphone 210B, a video display 250C, a speaker 250D), and one or more network interface controller cards (NICs) 230 coupled to input and output signal multiplexer and demultiplexer units (e.g., packet MUX 220A and packet DMUX 220B). NIC 230 may be a standard hardware component, such as an Ethernet LAN adapter, or any other suitable network interface device, or a combination thereof.

Camera 210A and microphone 210B are designed to capture participant video and audio signals, respectively, for transmission to other conferencing participants. Conversely, video display 250C and speaker 250D are designed to display and play back video and audio signals received from other participants, respectively. Video display 250C may also be configured to optionally display participant/terminal 140's own video. Camera 210A and microphone 210B outputs are coupled to video and audio encoders 210G and 210H via analog-to-digital converters 210E and 210F, respectively. Video and audio encoders 210G and 210H are designed to compress input video and audio digital signals in order to reduce the bandwidths necessary for transmission of the signals over the electronic communications network. The input video signal may be live, or pre-recorded and stored video signals. The encoders compress the local digital signals in order to minimize the bandwidth necessary for transmission of the signals.

In an exemplary embodiment of the present invention, the audio signal may be encoded using any suitable technique known in the art (e.g., G.711, G. 729, G.729EV, MPEG-1, etc.). In a preferred embodiment of the present invention, the scalable audio codec G.729EV is employed by audio encoder 210G to encode audio signals. The output of audio encoder 210G is sent to multiplexer MUX 220A for transmission over network 100 via NIC 230.

Packet MUX 220A may perform traditional multiplexing using the RTP protocol. Packet MUX 220A may also perform any related Quality of Service (QoS) processing that may be offered by network 100 or directly by a video communication application (see e.g. International patent application No. PCT/US06/061815). Each stream of data from terminal 140 is transmitted in its own virtual channel or "port number" in IP terminology.

Video encoder 210G is a scalable video encoder that has multiple outputs, corresponding to the various layers (here labeled "base" and "enhancement"). It is noted that simulcasting is a special case of scalable coding, where no inter layer prediction takes place. In the following, when the term scalable coding is used, it includes the simulcasting case. The operation of the video encoder and the nature of the multiple outputs are described in more detail herein below.

In the H.264 standard specification, it is possible to combine views of multiple participants in a single coded picture by using a flexible macroblock ordering (FMO) scheme. In this scheme, each participant occupies a portion of the coded image corresponding to one of its slices. Conceptually, a single decoder can be used to decode all participant signals. However, from a practical view, the receiver/terminal will have to decode several smaller independently coded slices. Thus, terminal 140 shown in FIG. 2 with decoders 230A may be used in applications of the H.264 specification. It is noted that the server for forwarding slices is a CSVCS.

In terminal 140, demultiplexer DMUX 220B receives packets from NIC 320 and redirects them to the appropriate decoder unit 230A.

The SERVER CONTROL block in terminal 140 coordinates the interaction between the server (SVCS/CSVCS) and the end-user terminals as described in International patent applications Nos. PCT/US06/028366 and PCT/US06/62569. In a point-to-point communication system without intermediate servers, the SERVER CONTROL block is not needed. Similarly, in non-conferencing applications, point-to-point conferencing applications, or when a CSVCS is used, only a single decoder may be needed at a receiving end-user terminal. For applications involving stored video (e.g., broadcast of pre-recorded, pre-coded material, the transmitting end-user terminal may not involve the entire functionality of the audio and video encoding blocks and all blocks preceding them (camera, microphone, etc.). Specifically, only the portions related to selective transmission of video packets, as explained below, need to be provided.

Although the word "terminal" is used in this context, the various components of the terminal may be separate devices that are interconnected to each other, they may be integrated in a personal computer in software or hardware, or they could be combinations thereof.

Figure 3:
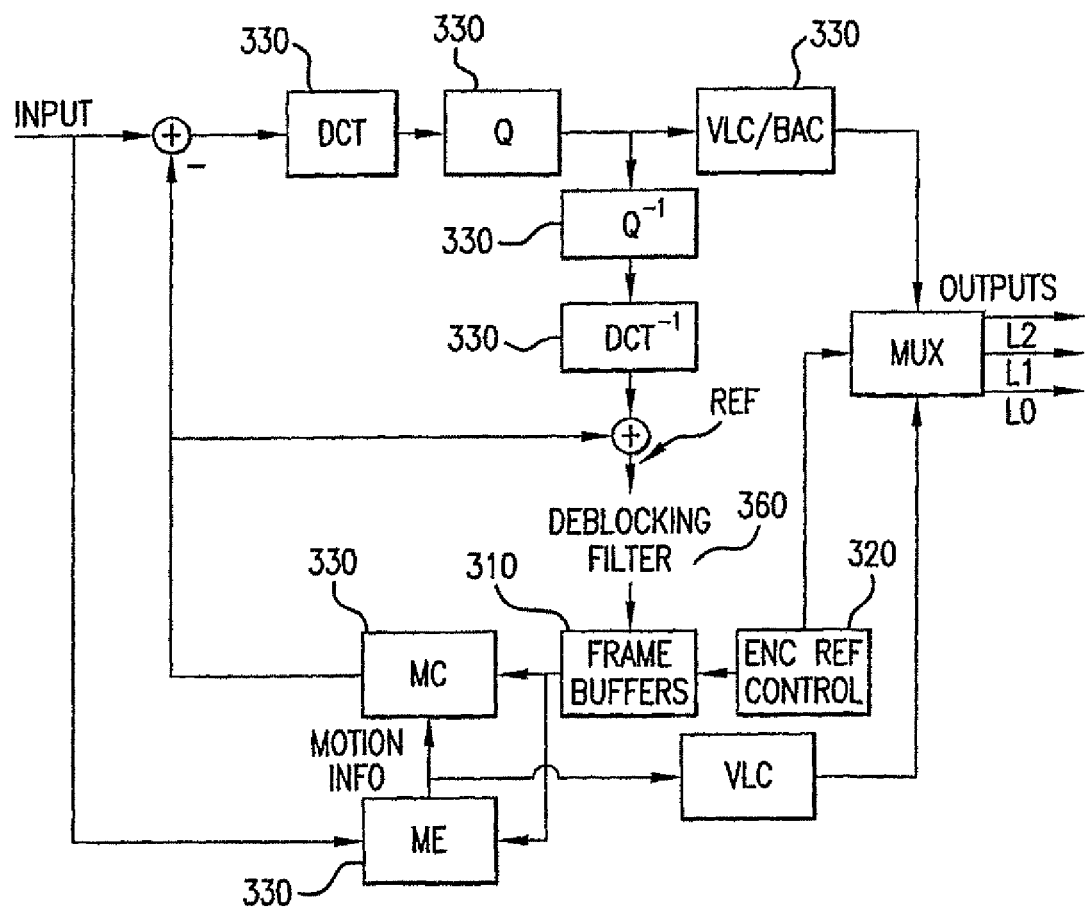
FIG. 3 is a block diagram illustrating an exemplary architecture of a video encoder (base and temporal enhancement layers) in accordance with the principles of the present invention.

FIG. 3 shows an exemplary base layer video encoder 300. Encoder 300 includes a FRAME BUFFERS block 310 and an Encoder Reference Control (ENC REF CONTROL) block 320 in addition to conventional "text-book" variety video coding process blocks 330 for motion estimation (ME), motion compensation (MC), and other encoding functions. Video encoder 300 may be designed, for example, according to the H.264/MPEG-4 AVC (ITU-T and ISO/IEC JTC 1, "Advanced video coding for generic audiovisual services," ITU-T Recommendation H.264 and ISO/IEC 14496-10 (MPEG4-AVC)) or SVC (J. Reichel, H. Schwarz, and M. Wien, "Joint Scalable Video Model JSVM 4," JVT-Q202, Document of Joint Video Team (JVT) of ITU T SG16/Q.6 and ISO/IEC JTC 1/SC 29/WG 11, October 2005). It will be understood that any other suitable codecs or designs can be used for the video encoder, including, for example, the designs disclosed in International patent applications Nos. PCT/US06/28365 and PCT/US06/62569. If spatial scalability is used, then a DOWNSAMPLER is optionally used at the input to reduce the input resolution (e.g., from CIF to QCIF).

ENC REF CONTROL block 320 is used to create a "threaded" coding structure. (See e.g., International patent application No, PCT/US06/28365). Standard block-based motion-compensated codecs have a regular structure of I, P, and B frames. For example, in a picture sequence (in display order) such as IBBPBBP, the 'P' frames are predicted from the previous P or I frame in the sequence, whereas the B pictures are predicted using both the previous and next P or I frame. Although the number of B pictures between successive I or P pictures can vary, as can the rate at which I pictures appear, it is not possible, for example, for a P picture to use as a reference for prediction another P picture that is earlier in time than the most recent one. The H.264 coding standard advantageously provides an exception in that two reference picture lists are maintained by the encoder and decoder, respectively, with appropriate signaling information that provide for reordering and selective use of pictures from within those lists. This exception can be exploited to select which pictures are used as references and also which references are used for a particular picture that is to be coded. In FIG. 3, FRAME BUFFERS block 310 represents memory for storing the reference picture list(s). ENC REF CONTROL block 320 is designed to determine which reference picture is to be used for the current picture at the encoder side.

The operation of ENC REF CONTROL block 320 is placed in further context with reference to an exemplary layered picture coding "threading" or "prediction chain" structure 400 shown in FIG. 4, in which the letter 'L' is used to indicate an arbitrary scalability layer, followed by a number to indicate the temporal layer (0 being the lowest, or coarsest). The arrows indicate the direction, source, and target of prediction. L0 is simply a series of regular P pictures spaced four pictures apart. L1 has the same frame rate, but prediction is only allowed from the previous L0 frame. L2 frames are predicted from the most recent L0 or L1 frame. L0 provides one fourth (1:4) of the full temporal resolution, L1 doubles the L0 frame rate (1:2), and L2 doubles the L0+L1 frame rate (1:1).

Additional or fewer layers can be similarly constructed to accommodate different bit rate/scalability requirements, depending on the requirements of the specific implementation of the present invention. A simple example is shown in FIG. 5 where a traditional prediction series of IPPP . . . frames is converted to two layers.

Codecs 300 utilized in implementations of the present invention may be configured to generate a set of separate picture "threads" (e.g., a set of three threads 410-430) in order to enable multiple levels of temporal scalability resolutions (e.g., L0-L2) and other enhancement resolutions (e.g., S0-S2). A thread or prediction chain is defined as a sequence of pictures that are motion-compensated using pictures either from the same thread, or pictures from a lower level thread. The arrows in FIG. 4 indicate the direction, source, and target of prediction for three threads 410-430. Threads 410-420 have a common source L0 but different targets and paths (e.g., targets L2, L2, and L0, respectively). The use of threads allows the implementation of temporal scalability, since any number of top-level threads can be eliminated without affecting the decoding process of the remaining threads.

It is noted that in encoder 300, ENC REF CONTROL block may use only P pictures as reference pictures. The use of B pictures with both forward and backward prediction increases the coding delay by the time it takes to capture and encode the reference pictures used for the B pictures. In traditional interactive communications, the use of B pictures with prediction from future pictures increases the coding delay and is therefore avoided. However, B pictures also may be used with accompanying gains in overall compression efficiency. Using even a single B picture in the set of threads (e.g., by having L2 be coded as a B picture) can improve compression efficiency. For applications that are not delay-sensitive, some or all pictures (with the possible exception of L0) can be B pictures with bi-directional prediction. It is noted that specifically with the H.264 standard, it is possible to use B pictures without incurring extra delay, as the standard allows the use of two motion vectors that both use reference pictures that are in the past in display order. In this case, such B pictures can be used without increasing the coding delay compared with P picture coding. Similarly, the L0 pictures could be I pictures, forming traditional groups of pictures (GOPs).

With renewed reference to FIG. 3, base layer encoder 300 can be augmented to create spatial and/or quality enhancement layers, as described, for example, in the H.264 SVC Standard draft and in International patent application No. PCT/US06/28365. FIG. 6 shows the structure of an exemplary encoder 600 for creating the spatial enhancement layer. The structure of encoder 600 is similar to that of base layer codec 300, with the additional feature that the base layer information is also made available to encoder 600. This information may include motion vector data, macroblock mode data, coded prediction error data, and reconstructed pixel data. Encoder 600 can re-use some or all of this information in order to make coding decisions for the enhancement layer. For this purpose, the base layer data has to be scaled to the target resolution of the enhancement layer (e.g., by factor of 2 if the base layer is QCIF and the enhancement layer is CIF). Although spatial scalability usually requires two coding loops to be maintained, it is possible (e.g., under the H.264 SVC draft standard) to perform single-loop decoding by limiting the base layer data that is used for enhancement layer coding to only values that are computable from the information encoded in the current picture's base layer. For example, if a base layer macroblock is inter-coded, then the enhancement layer cannot use the reconstructed pixels of that macroblock as a basis for prediction. It can, however, use its motion vectors and the prediction error values since they are obtainable by just decoding the information contained in the current base layer picture. Single-loop decoding is desirable since the complexity of the decoder is significantly decreased.

The threading structure can be utilized for the enhancement layer frames in the same manner as for the base layer frames. FIG. 7 shows an exemplary threading structure 700 for the enhancement layer frames following the design shown in FIG. 4. In FIG. 7, the enhancement layer blocks in structure 700 are indicated by the letter 'S'. It is noted that threading structures for the enhancement layer frames and the base layer can be different, as explained in International patent application No. PCT/US06/28365.

Further, similar enhancement layer codecs for quality scalability can be constructed, for example, as described in the SVC draft standard and described in International patent application No. PCT/US06/28365. In such codecs for quality scalability, instead of building the enhancement layer on a higher resolution version of the input, the enhancement layer is built by coding the residual prediction error at the same spatial resolution as the input. As with spatial scalability, all the macroblock data of the base layer can be re-used at the enhancement layer for quality scalability, in either single- or dual-loop coding configurations.

For brevity, the following description is limited to spatial scalability, but it will be understood that the described techniques also can be applied to quality or fidelity scalability.

It is noted that due to the inherent temporal dependency arising from motion-compensated prediction in state-of-the-art video codecs, any packet losses at a given picture will not only affect the quality of that particular picture, but will also affect all future pictures for which the given picture acts as a reference, either directly or indirectly. This is because the reference frame that the decoder can construct for future predictions will not be the same as the one used at the encoder. The ensuing difference, or drift, can have tremendous impact on the visual quality of the decoded video signals. However, as described in International patent application Nos. PCT/US06/28365 and PCT/US06/061815, structure 400 (FIG. 4) has distinct advantages in terms of robustness in the presence of transmission errors.

As shown in FIG. 4, threading structure 400 creates three self-contained chains of dependencies. A packet loss occurring at an L2 picture will only affect L2 pictures; L0 and L1 pictures can still be decoded and displayed. Similarly, a packet loss occurring at an L1 picture will only affect L1 and L2 pictures; L0 pictures can still be decoded and displayed.

The same error containment properties of the threads extend to S packets. For example, with structure 700 (FIG. 7) a loss occurring at an S2 picture only affects the particular picture, whereas a loss at an S1 picture will also affect the following S2 picture. In either case, drift will terminate upon decoding of the next S0 picture.

With the use of threaded structures, if the base layer and some enhancement layer pictures are transmitted in such a way that their delivery is guaranteed, the remaining layers can be transmitted on a best-effort basis without catastrophic results in the case of a packet loss. The required guaranteed transmissions can be performed using Diffserv, FEC techniques, or other suitable techniques known in the art. For the description herein it is assumed that the guaranteed and best effort transmissions occur over the two actual or virtual channels (e.g. a High Reliability Channel (HRC) and Low Reliability Channel (LRC), respectively) that offer such differentiated quality of service. (See e.g., International patent application Nos. PCT/US06/028366 and PCT/US06/061815).

Consider, for example, that layers L0-L2 and S0 are transmitted on the HRC, and that S1 and S2 are transmitted on the LRC. Although the loss of an S1 or S2 packet would cause limited drift, it would still be desirable to be able to conceal as much as possible the loss of information. The concealment of a lost S1 or S2 picture can only use information available to the decoder, namely past S pictures, and also the coded information of the current picture's base layer.

An exemplary concealment technique according to the present invention utilizes the base layer information of the lost enhancement layer frame, and applies it in the decoding loop of the enhancement layer. The base layer information that can be used includes motion vector data (appropriately scaled for the target layer resolution), coded prediction error difference (upsampled for the enhancement layer resolution, if necessary), and intra data (upsampled for the enhancement layer resolution, if necessary). Prediction references from prior pictures are taken, when needed, from the enhancement layer resolution pictures rather than the corresponding base layer pictures. This data allows the decoder to reconstruct a very close approximation of the missing frame, thus minimizing the actual and perceived distortions on the missing frame. Furthermore, decoding of any dependent frames is now also possible since a good approximation of the missing frame is available.

FIG. 8 shows exemplary steps 810-840 of a concealment decoding process 800, using an example of a two-layer spatial scalability encoded signal with resolutions QCIF and CIF and two prediction threads (L0/S0 and L1/S1). It will be understood that process 800 is applicable to other resolutions and to different numbers of threads than shown. In the example, it is assumed that at coded data arrival step 810 the coded data for L0, S0, and L1 arrive intact at the receiving terminal, but the coded data for S1 are lost. Further, it is assumed that all coded data for pictures prior to the picture corresponding to time t0 also have been received at the receiving terminal. The decoder is thus able to properly decode both a QCIF and a CIF picture at time t0. The decoder can further use the information contained in L0 and L1 to reconstruct the correct decoded L1 picture corresponding to time t1.

FIG. 8 shows a particular example, in which a block of the L1 picture at time t1, LB1 is encoded at base layer decoding step 820 by using motion-compensated prediction with a motion vector LMV1 and a residual LRES1 that is to be added to the motion-compensated prediction. The data for LMV1 and LRES1 are contained in the L1 data received by the receiving terminal. The decoding process requires block LB0 from the prior base layer picture (the L0 picture), which is available at the decoder as a result of the normal decoding process. Since the S1 data assumed to be lost in this example, the decoder cannot use the corresponding information to decode the enhancement layer picture.

Concealment decoding process 800, constructs an approximation for an enhancement layer block SB1. At concealment data generation step 830, process 800 generates concealment data by obtaining the coded data of the corresponding base layer block LB1, in this example LMV1 and LRES1. It then scales the motion vector to the resolution of the enhancement layer, to construct an enhancement layer motion vector SMV1. For the two-layer video signal example considered, SMV1 is equal to two times LMV1 since the ratio of resolutions of the scalable signal is 2. Further, the concealment decoding process 800 upsamples the base layer residual signal to the resolution of the enhancement layer, by a factor of 2 in each dimension, and then optionally low-pass filters the result with the filter LPF, in accordance with well-known principles of sample rate conversion processes. The further result of concealment data generation step 830 is a residual signal SRES1. Next step 840 (Decoding process for the enhancement layer with concealment) uses the constructed concealment data SMV1 and SRES1 to approximate block SB1. It is noted that the approximation requires the block SB0 from the previous enhancement layer picture, which is assumed to be available at the decoder as a result of the regular decoding process of the enhancement layer. Different encoding modes may operate in the same or similar way.

A further illustrative application of the inventive concealment technique relates to the example of high resolution images. In high resolution images (e.g., greater than CIF) often more then one MTU (maximum transmission unit) is required to transmit a frame of the enhancement layer. If the chance of successful transmission of a single MTU sized packet is p, the chance of successful transmission of a frame comprised of n MTUs is $p^n$. Traditionally, in order to display such a frame, all n packets have to be successfully delivered.

In the application of the inventive concealment technique, an S layer frame is broken into MTU size slices at the encoder for transmission. On the decoder side whatever slices are available from the S picture as received are used. Missing slices are compensated for using the concealment method (e.g., process 800), thus reducing the overall distortion.

In a laboratory experiment, this concealment technique provided similar or better performance when compared with direct coding at the effective communication rate (total rate minus loss rate). For the experiment, it was assumed that layers L0-L2 are reliably transmitted on the HRC, while layers S1 and S2 are transmitted on the LRC. Actual quality losses, in terms of Y-PSNR, were in the range of 0.2-0.3 dB per 5% of packet loss, clearly outperforming other known concealment techniques such as frame copy or motion-compensated frame copy. (See e.g., S. Bandyopadhyay, Z. Wu, P. Pandit, and J. Boyce, "Frame Loss Error Concealment for H.264/AVC," Doc. JVT-P072, Poznan, Poland, July 2005, who report several dBs of loss with loss rates of even 5% in evaluations of single-layer AVC coding with an IPP . . . PI structure, and an I period of 1 sec.) The laboratory experiment results demonstrate that the technique is effective for providing error resilience in scalable codecs.

FIG. 9 shows rate-distortion curves obtained using the standard "foreman" video test sequence with different QPs. For each QP, rate-distortion values were obtained by dropping different amount of S1 and S2 frames, while applying the inventive error concealment technique described above. As seen in FIG. 9, the right-most points for each QP curve correspond to no loss, and then (in a right-to-left direction), 50% of S2 dropped, 100% of S2 dropped, 100% of S2 and 50% of S1 dropped, and 100% of S1 and S2 dropped. The R-D curve of the codec, which is obtained by connecting the zero-loss points for the different QPs, is overlayed. It will be seen from FIG. 9 that various curves particularly for QPs smaller than 30 are close to the R-D curve but in some case are higher. It is expected that the difference will be eliminated with further optimization of the basic codec used.

The laboratory experiment results show that Y-PSNR is similar to the Y-PSNR of the same encoder operating at the effective transmission rate. This suggests that the concealment technique can be advantageously used for rate control purposes. The effective transmission rate is defined as the transmission rate minus the loss rate, i.e., the rate calculated based on the packets that actually arrive at the destination. The bit rate corresponding to S1 and S2 frames is typically 30% of the total for the specific coding structure, which implies that any bit rate between 70% and 100% may be achieved by eliminating a selected number of S1 and S2 frames for rate control. Bit rates between 70% and 100% may be achieved by selecting the number of S2 or S1 and S2 frames that are dropped in a given time period.

An even wider range for rate control may be obtained for picture coding structure using LR/SR pictures, which are described, for example, in International patent application No. PCT/US06/061815. With such picture structures, it possible not to transmit the S0 in the HRC, but to only include the lower temporal resolution SR in the HRC. This feature enables a wider range for rate control.

Table I summarizes the rate percentage of the different frame types for a typical video sequences (e.g., spatial scalability, QCIF-CIF resolution, three-layer threading, 380 Kbps).

TABLE 1

| Frame Type | Rate (%) | Cummulative Rate (%) |
|---|---|---|
| L0 | 15 | 15 |
| L1 | 7 | 22 |
| L2 | 4 | 26 |
| S0 | 46 | 72 |
| S1 | 18 | 90 |
| S2 | 10 | 100 |

By combining different frame types, the concealment technique can achieve practically any desired rate. For example, when all of the L0-L2 and S0 pictures are included, and only 1 out of 10 S1 pictures are dropped, a rate which is approximately 72+1.8=73.8% of the total can be achieved. Alternative techniques known in the art such as Fine Granularity Scalability (FGS) attempt to achieve similar rate flexibility, but with very poor rate-distortion performance and significant computational overhead. The concealment technique of the present invention offers the rate scalability associated with FGS, but without the coding efficiency penalty associated with such techniques.

The intentional elimination of S1 and S2 frames from the video transmission may be performed either at the encoder or at an available intermediate gateway (e.g., a SVCS/CSVCS).

Further, it will be understood that the application of the concealment technique of the present invention for achieving rate control has been described herein with the loss of S1 frames in a two-layer structure, only for purposes of illustration. In practice, the technique is not limited to a particular threading structure, but can be applied to any spatially-scalable codec that uses a pyramidal temporal structure (e.g., structures including more than two quality or spatial levels, different temporal structures, etc.).

A further use of the inventive concealment technique is to display the video signal at a resolution in between the two coded resolutions. For example, assume a video signal is coded at QCIF and CIF resolution using a spatially scalable codec. If a user wants to display the output in ½ CIF resolution (HCIF), a traditional decoder would follow one of two approaches: 1) decode the QCIF signal and upsample to HCIF, or 2) decode the CIF signal and downsample to HCIF. In the first case, the HCIF picture quality will not be good, but the bitrate used will be low. In the second case, the quality can be very good, but the bitrate used will also be nearly double that required in the first approach. These disadvantages of traditional decoders are overcome by the inventive error concealment techniques.

For example, intentionally discarding all S1 and S2 frames can result in a significant bandwidth reduction with very little drop in quality by applying the S1/S2 error concealment technique described herein. By downsampling the resulting decoded CIF signal, a very good rendition of the HCIF signal is obtained. It is noted that conventional simulcast techniques in which separate single-layer streams are transmitted at QCIF and CIF resolutions, do not allow such derivation of the signal at an intermediate resolution at a usable bit rate unless the frame rate is also dropped. The inventive concealment technique exploits spatially scalable coding for deriving intermediate resolution signals at a usable bit rate.

In practice, application of the inventive concealment technique for deriving an intermediate resolution requires operation of the enhancement layer decoding loop for S0 at full resolution. The decoding involves both the generation of the decoded prediction error, as well as the application of motion compensation at full resolution. In order to reduce the computational requirements only the decoded prediction error may be generated in full resolution, followed by downsampling to the target resolution (e.g., HCIF). The reduced resolution signal may then be motion compensated using appropriately scaled motion vectors and residual information. This technique can also be used on any portion of the 'S' layer that is retained for transmission to the receiver. As there will be drift introduced in the enhancement layer decoding loop, a mechanism to periodically eliminate drift may be required. In addition to standard techniques such as I frames, the periodic use of the INTRA_BL mode of spatial scalability for each enhancement layer macroblock may be employed, where only information from the base layer is used for prediction. (See e.g., PCT/US06/28365). Since no temporal information is used, the drift for that particular macroblock is eliminated. If SR pictures are used, drift can also be eliminated by decoding all SR pictures at full resolution. Since SR pictures are far apart, there can still be considerable gain in computational complexity. In some cases, the technique for deriving an intermediate resolution signal may be modified by operating the enhancement layer decoder loop in reduced resolution. In cases, where CPU resources are not a limiting factor and faster switching than the SR separation is required or desired, the same (i.e., operating the decoder loop at full resolution) can be applied to higher temporal level (e.g., S0) as needed.

Another exemplary application of the inventive concealment technique is to a video conferencing system in which spatial or quality levels are achieved via simulcast. In this case, concealment is performed using base layer information as described above. The enhancement layer's drift can be eliminated via any one of a) threading, b) standard SVC temporal scalability, c) periodic I frames, and d) periodic intra macroblocks.

An SVCS/CSVCS that is utilizing simulcast to provide spatial scalability, and is only transmitting the higher resolution information for a particular destination for a particular stream (for example if it assumes no or almost no errors), may replace a missing frame of the high resolution with a low resolution one, anticipating such error concealment mechanism on the decoder, and relying on temporal scalability to eliminate drift as discussed above. It will be understood that the concealment process described can be readily adapted to create an effective rate control on such a system.

In the event that the SVCS, CSVCS or the encoder responsible for discarding the higher resolution frames or detecting its loss, cannot assume that the decoder receiving such frames is equipped with the concealment method described herein, such entity may create a replacement high resolution frame that will achieve a similar functionality by one of following methods:

a) for error resilience in spatial scalability coding, create a synthetic frame, based on parsing of the lower resolution frame that will include only the appropriate signaling to use upsampled base layer information without any additional residuals or motion vector refinement;

b) for rate control in a system using spatial scalability, the combination of the method described in (a) with the addition that some macroblocks (MBs) containing significant information from the original high resolution frame are retained;

c) for an error resilient system using simulcast for spatial scalability, create a replacement high resolution frame that will include synthetic MBs that will include upsampled motion vectors and residual information; d) for rate control in a system using simulcast for spatial scalability, the method described in (c) with the addition that some MBs containing significant information from the original high resolution frame are retained.

In the cases a) and b) above, the signaling to use only an upsampled version of the base layer picture can be performed either in-band through the coded video bitstream or through out-of-band information that is sent from the encoder or SVCS/CSVCS to the receiving terminal. For the in-band signaling case, specific syntax elements in the coded video bitstream must be present in order to instruct the decoder to use only the base layer information for some or all enhancement layer MBs. In an exemplary codec of the present invention, which is based on the JD7 version of the SVC specification (see T. Wiegand, G. Sullivan, J. Reichel, H. Schwarz, M. Wien, eds., "Joint Draft 7, Rev. 2: Scalable Video Coding," Joint Video Team, Doc. JVT-T201, Klagenfurt, July 2006, incorporated herein by reference in its entirety) and described in provisional U.S. patent application Ser. No. 60/862,510, a set of flags can be introduced at the slice header, to indicate that when a macroblock is not coded, specific prediction modes that utilize the base layer data are to be used. By skipping all enhancement layer macroblocks, the encoder or SVCS/CSVCS will practically eliminate the S1 or S2 frames, but replace them with very small data packets that only contain the few bytes necessary to indicate the default prediction modes and the fact that all macroblocks are skipped. Similarly, for performing rate control, the encoder or SVCS/SVCS may selectively eliminate some information from enhancement layer MBs. For example, the encoder or SVCS/SVCS may selectively maintain motion vector refinements, but eliminate residual prediction, or keep residual prediction, but eliminate motion vector refinements.

With continued reference to the SVC JD7 specification, there are several flags in the MB layer (in scalable extension) that are used for predicting information from the base layer, if the base layer exists. They are base_mode_flag, motion_prediction_flag and residual_prediction_flag. Similarly, there already exists a flag in the slice header, adaptive_prediction_flag, which is used to indicate the presence of base_mode_flag in the MB layer. To trigger the concealment operation, one needs to set base_mode_flag to 1 for every MB, which can be done using the already existing adaptive_prediction_flag. By setting the slice header flag adaptive_prediction_flag to 0, and taking into account that the default value for the residue_prediction_flag in inter MBs is 1. we can indicate that all MBs in a slice are skipped (using mb_skip run or mb_skip_flag signaling) and thus direct the decoder to essentially perform the concealment operation disclosed herein.

It is recognized that a potential drawback of the concealment technique is that the bitrate of the coded stream without the S1 and S2 frames may be very uneven or "bursty," since the S0 frames are typically quite large (e.g., as high as 45% of the total bandwidth). To mitigate this behavior, in a modification (hereinafter "progressive concealment") the S0 packets may be transmitted by splitting them into smaller packets and/or slices and spreading their transmission over the time interval between successive S0 pictures. The entire S0 picture will not be available for the first S2 picture, but information that has been received by the first S2 picture (i.e., portions of S0 and the entire L0 and L2) can be used for concealment purposes. In this manner the decoder can also recover an appropriate reference frame in time to display the L1/S1 picture, which would further help in creating decoded version of both the L1/S1 picture and the second L2/S2. Otherwise, as they are further apart from the L0 frame, they may show more concealment artifacts due to motion.

Another alternative solution to mitigate the effects of bursty S0 transmissions is to smooth out the variable bit-rate (VBR) traffic by additional buffering at the cost of increased end-to-end delay. It is noted that in multipoint conferencing applications, there is inherent statistical multiplexing at the server. Therefore, the VBR behavior of the traffic originating from the server will be naturally smoothed.

International patent application No. PCT/US06/061815 describes the problems of error resilience and random access and provides solutions appropriate for different application scenarios.

The progressive concealment technique provides a further solution for performing video switching. The progressive concealment technique described above also may be used for video switching. An exemplary switching application is to a single-loop, spatially scalable signal coded at QCIF and CIF resolutions with a three-layer threading structure, with the three-layer threading structure shown in FIG. 7. As described in International patent application No. PCT/US06/061815, increased error resilience can be achieved by ensuring reliable transmission of some of the L0 pictures. The L0 pictures that are reliably transmitted are referred to as LR pictures. The same threading pattern can be extended to the S pictures, as shown in FIG. 10. The temporal prediction paths for the S pictures are identical to those of the L pictures. FIG. 10 shows an exemplary SR period of ⅓ (one out of every 3 S0 pictures is SR) for purposes of illustration. In practice, different periods and different threading patterns can be used in accordance with the principles of the present invention. Further, different paths in the S and L pictures could also be used, but with a reduction in coding efficiency for the S pictures. As with LR pictures, the SR pictures are assumed to be transmitted reliably. As described in International patent application No. PCT/US06/061815, this can be accomplished using a number of techniques, such as DiffServ coding (where LR and SR are in the HRC), FEC or ARQ.

In the exemplary switching application of the progressive concealment technique, the progressive concealment technique, an end-user at terminal receiving a QCIF signal may desire to switch to a CIF signal. In order to be able to start decoding the enhancement layer CIF signal, the terminal must acquire at least one correct CIF reference picture. A technique disclosed in International patent application No. PCT/US06/061815 involves using periodic intra macroblocks, so that within a period of time all macroblocks of the CIF picture will be intra coded. A drawback is that it will take a significant amount of time to do so, if the percentage of intra macroblocks is kept low (to minimize their impact on the total bandwidth). In contrast, the switching application of the progressive concealment technique exploits the reliable transmission of the SR pictures in order to be able to start decoding the enhancement layer CIF signal.

The SR pictures can be transmitted to the receiver and be decoded even if it operates at a QCIF level. Since they are infrequent, their overall effect on the bit rate can be minimal. When a user switches to the CIF resolution, the decoder can utilize the most recent SR frame, and proceed as if intermediate S pictures until the first S picture received were lost. If additional bit rate is available, the sender or server can also forward cached copies of all intermediate S0 pictures to further aid the receiver in constructing a reference picture as close to the starting frame of CIF playback as possible. The rate-distortion performance of the S1/S2 concealment technique will ensure that the impact on quality is minimized.

The inventive technique can also be used advantageously when the end-user decodes at an intermediate output resolution, e.g., HCIF, and desires to switch to CIF. An HCIF signal can be effectively derived from the L0-L2 and portion of the S0-S2 pictures (e.g., only S0), coupled with concealment for dropped S frames. In this case, the decoder, which receives at least a portion of the S0 pictures, can immediately switch to CIF resolution with very small PSNR penalty. Further, this penalty will be eliminated as soon as the next S0/SR picture arrives. Thus, in this case, there is practically no overhead and almost instantaneous switching can be achieved.

It is noted that although typical spatial coding structures employ 1:4 picture area ratios, some users are more comfortable with resolution changes of 1:2. Therefore, in practice HCIF to CIF switching transitions are much more likely than QCIF to CIF switching transitions, for example, in desktop communication applications. A common scenario in video conferencing is that the screen real estate is split into a large picture of the active speaker surrounded by smaller pictures of the other participants, and where the active speaker image automatically occupies the larger image. In the case where the smaller images where created using the rate control methods described herein, such a switch can be done frequently without any overhead. The switching of participant images can be done frequently in an "active" layout without any overhead. This feature is desirebable for accommodating both conference participants who prefer to view such an active layout, and other conference participants who prefer a static view. Since the switching-by-concealment method does not require any additional information to be sent by the encoder, the choice of layout by one receiver does not impact the bandwidth received by others.

The foregoing description refers to creating effective rendering for intermediate resolutions and bit rates that span the range between resolutions/bit rates directly provided by the encoder. It will be understood that other methods that are known to decrease the bit rate (e.g., by introducing drift) such as data partitioning or re-quantization can be employed by the SVCS/CSVCS in conjunction with inventive methods described herein to provide a more detailed manipulation of the bit stream. For example, assume that a resolution of ⅓ CIF is desired when only QCIF and CIF are available, and that the SR, S0-S2 coding structure is used. Eliminating S1 and S2 only may result in a bit rate that is too high to effectively be used as ⅓ CIF. Further, eliminating S0 may result in a bit rate that is too low and/or be visually unacceptable due to motion-related artifacts. In such a case, reducing the amounts of bits of the S0 frames using known methods as data partitioning or re-quantization may be useful in conjunction with the SR transmission (either in VBR mode or using the progressive concealment) to provide a more optimized result. It will be understood that these methods may be applied to the S1 and S2 levels to achieve more fine-tuned rate control.

Although the preferred embodiments described herein use the H.264 SVC draft standard, as is obvious to persons skilled in the art the techniques can be directly applied to any coding structure that allows multiple spatial/quality, and temporal levels.

It also will be understood that in accordance with the present invention, the scalable codecs and concealment techniques described herein may be implemented using any suitable combination of hardware and software. The software (i.e., instructions) for implementing and operating the aforementioned scalable codecs can be provided on computer-readable media, which can include without limitation, firmware, memory, storage devices, microcontrollers, microprocessors, integrated circuits, ASICS, on-line downloadable media, and other available media.

The invention claimed is:

1. A digital video decoding system, the system comprising:
a decoder (including a combination of hardware and software) configured to decode a received digital video signal, which is coded in a scalable video coding format supporting temporal scalability and at least one of spatial and quality scalability,
wherein the scalable video coding format for spatial scalability includes a base spatial and at least one spatial enhancement layer, for quality scalability includes a base quality layer and at least one quality enhancement layer, and for temporal scalability includes a base temporal layer and at least one temporal enhancement layer, wherein the base temporal layers and enhancement temporal layers are interlinked by a threaded picture prediction structure for at least one of the spatial or quality scalability layers,
wherein, for decoding a picture at a target spatial or quality layer higher than the corresponding base layer, the decoder is configured to use coded information from a spatial or quality layer of said picture lower than the target layer in the threaded prediction structure when a portion of the target layer's coded information is lost or not available,
wherein the digital video decoding system is disposed in a receiving endpoint, the system further comprising:
a linking communication network;
a conferencing server linked to the receiving endpoint and at least one transmitting endpoint by at least one communication channel each over the communication network, and
at least one endpoint that transmits the coded digital video that is coded in the scalable video coding format,
wherein the conferencing server is configured to selectively eliminate portions of input video signals received from transmitting endpoints that correspond to layers higher than the base spatial or quality layer, prior to creating an output video signal that is forwarded to the receiving endpoint,
wherein the conferencing server linked to the receiving endpoint and at least one transmitting endpoint is one of:
a Transcoding Multipoint Control Unit using cascaded decoding and encoding;
a Switching Multipoint Control Unit by selecting which input to transmit as output;
a Scalable Video Communication Server using selective multiplexing; and
a Compositing Scalable Video Communication Server using selective multiplexing and bitstream-level compositing.

2. The system of claim 1 wherein an encoder (including a combination of hardware and software) of the at least one transmitting endpoint is configured to encode transmitted media as frames in a threaded coding structure having a number of different temporal levels, wherein a subset of the frames ("R") is particularly selected for reliable transport and includes at least the frames of the lowest temporal layer in the threaded coding structure so that the decoder can decode at least a portion of received media based on a reliably received frame of the type R after packet loss or error and thereafter is synchronized with the encoder, and wherein the conferencing server selectively eliminates portions of the input video signals received from transmitting endpoints that correspond to layers higher than the base spatial or quality layer in non-R frames only, prior to creating the output video signal that is forwarded to the receiving endpoint.

3. The system of claim 1, wherein the conferencing server is further configured to control the transmission rate of the output video signal that is forwarded to the receiving endpoint so that the retained portions of the input video signals received from transmitting endpoints that correspond to layers higher than the base spatial or quality layer do not adversely affect the smoothness of an output bit rate.

4. The system of claim 1, wherein the selective elimination by the conferencing server is performed according to desired output bit rate requirements.

5. The system of claim 1, wherein the decoder is configured to display decoded output pictures at a desired spatial resolution that falls in between an immediately lower and an immediately higher spatial layer provided by the coded video signal.

6. The system of claim 1, wherein the decoder is further configured to operate a decoding loop of the immediately higher spatial layer at a desired spatial resolution by scaling all coded data of the immediately higher spatial layer to the desired spatial resolution, and wherein resultant drift is eliminated by using at least one of:
   periodic intra pictures;
   periodic use of intra base layer mode; and
   full resolution decoding of at least the lowest temporal layer of the immediately higher spatial layer.

7. The system of claim 1, wherein the scalable video coding format includes at least one of:
   periodic intra pictures,
   periodic intra macroblocks, and
   threaded picture prediction,
   in order to avoid drift when the target layer's coded information that is lost or is not available corresponds to the base temporal layer.

8. The system of claim 1, where the scalable video coding format is based on hybrid coding, the format comprising H.264, VC-1 or AVS standards, wherein the coded information from a spatial or quality layer lower than the target layer used by the decoder when some or all of the target layer's coded information is lost or is not available comprises at least one of:
   motion vector data, appropriately scaled for the target layer's resolution;
   coded prediction error difference, upsampled to the target layer's resolution; and
   intra data, upsampled to the target layer's resolution,
and wherein the decoder is further configured to use the target layer's decoded pictures as references in the decoding process in order to construct the decoded output pictures, rather than the lower layer decoded reference pictures.

9. The system of claim 1, wherein the decoder is further configured to operate at least one decoding loop for spatial or quality layers higher than the target spatial or quality layer for at least the base temporal layer, so that when the decoder switches target layers it can immediately display decoded pictures at the new target layer resolution.

10. A method for decoding a digital video signal, the method comprising:
   receiving the digital video signal at a decoder (including a combination of hardware and software); the digital video signal being coded in a scalable video coding format supporting temporal scalability and at least one of spatial and quality scalability, wherein the scalable video coding format for spatial scalability includes a base spatial and at least one spatial enhancement layer, for quality scalability includes a base quality layer and at least one quality enhancement layer, and for temporal scalability includes a base temporal layer and at least one temporal enhancement layer, wherein the base temporal layers and enhancement temporal layers are interlinked by a threaded picture prediction structure for at least one of the spatial or quality scalability layers; and
   decoding a picture at a target spatial or quality layer higher than the corresponding base layer using coded information from a spatial or quality layer of said picture lower than the target layer in the threaded prediction structure when a portion of the target layer's coded information is lost or not available;
wherein the decoder is disposed in a receiving endpoint in a linking communication network,
wherein a conferencing server is linked to the receiving endpoint and at least one transmitting endpoint by at least one communication channel each over the communication network, and
wherein the at least one transmitting endpoint transmits the coded digital video that is coded in the scalable video coding format;
the method further comprising:
at the conferencing server, selectively eliminating portions of input video signals received from transmitting endpoints that correspond to layers higher than the base spatial or quality layer, prior to creating an output video signal that is forwarded to the receiving endpoint.
wherein the conferencing server linked to the receiving endpoint and at least one transmitting endpoint is one of:
   a Transcoding Multipoint Control Unit using cascaded decoding and encoding;
   a Switching Multipoint Control Unit by selecting which input to transmit as output;
   a Scalable Video Communication Server using selective multiplexing; and
   a Compositing Scalable Video Communication Server using selective multiplexing and bitstream-level compositing.

11. The method of claim 10, further comprising, at an encoder (including a combination of hardware and software) of the at least one transmitting endpoint, encoding transmitted media as frames in a threaded coding structure having a number of different temporal levels, wherein a subset of the frames ("R") is particularly selected for reliable transport and includes at least the frames of the lowest temporal layer in the threaded coding structure so that the decoder can decode at least a portion of received media based on a reliably received frame of the type R after packet loss or error and thereafter is synchronized with the encoder, and wherein the conferencing server selectively eliminates portions of the input video signals received from transmitting endpoints that correspond to layers higher than the base spatial or quality layer in non-R frames only, prior to creating the output video signal that is forwarded to the receiving endpoint.

12. The method of claim 10, further comprising, at the conferencing server controlling the transmission rate of the output video signal that is forwarded to the receiving endpoint so that the retained portions of the input video signals received from transmitting endpoints that correspond to layers higher than the base spatial or quality layer do not adversely affect the smoothness of an output bit rate.

13. The method of claim 10, wherein the selective elimination by the conferencing server is performed according to desired output bit rate requirements.

14. The method of claim 10, further comprising, at the decoder, displaying decoded output pictures at a desired spatial resolution that falls in between an immediately lower and an immediately higher spatial layer provided by the coded video signal.

15. The method of claim 10, further comprising, at the decoder, operating a decoding loop of the immediately higher spatial layer at a desired spatial resolution by scaling all coded data of the immediately higher spatial layer to the desired spatial resolution, and wherein resultant drift is eliminated by using at least one of:
- periodic intra pictures;
- periodic use of intra base layer mode; and
- full resolution decoding of at least the lowest temporal layer of the immediately higher spatial layer.

16. The method of claim 10, wherein the scalable video coding format includes at least one of:
- periodic intra pictures,
- periodic intra macroblocks, and
- threaded picture prediction,
in order to avoid drift when the target layer's coded information that is lost or is not available corresponds to the base temporal layer.

17. The method of claim 10, where the scalable video coding format is based on hybrid coding, the format comprising H.264, VC-1 or AVS standards, wherein the coded information from a spatial or quality layer lower than the target layer used by the decoder when some or all of the target layer's coded information is lost or is not available comprises at least one of:
- motion vector data, appropriately scaled for the target layer's resolution;
- coded prediction error difference, upsampled to the target layer's resolution; and
- intra data, upsampled to the target layer's resolution,
the method further comprising, at the decoder using the target layer's decoded pictures as references in the decoding process in order to construct decoded output pictures, rather that the lower layer decoded reference pictures.

18. The method of claim 10 further comprising, at the decoder operating at least one decoding loop for spatial or quality layers higher than the target spatial or quality layer for at least the base temporal layer, so that when the decoder switches target layers it can immediately display decoded pictures at the new target layer resolution.

19. A non-transitory computer readable medium comprising a set of executable instructions to direct a processor to decode a digital video signal, by:
receiving the digital video signal at a decoder (including a combination of hardware and software); the digital video signal being coded in a scalable video coding format supporting temporal scalability and at least one of spatial and quality scalability, wherein the scalable video coding format for spatial scalability includes a base spatial and at least one spatial enhancement layer, for quality scalability includes a base quality layer and at least one quality enhancement layer, and for temporal scalability includes a base temporal layer and at least one temporal enhancement layer, wherein the base temporal layers and enhancement temporal layers are interlinked by a threaded picture prediction structure for at least one of the spatial or quality scalability layers; and
decoding a picture at a target spatial or quality layer higher than the corresponding base layer using coded information from a spatial or quality layer of said picture lower than the target layer in the threaded prediction structure when a portion of the target layer's coded information is lost or not available;
wherein the decoder is disposed in a receiving endpoint in a linking communication network,
wherein a conferencing server is linked to the receiving endpoint and at least one transmitting endpoint by at least one communication channel each over the communication network, and
wherein the at least one transmitting endpoint transmits the coded digital video that is coded in the scalable video coding format;
at the conferencing server, selectively eliminating portions of input video signals received from transmitting endpoints that correspond to layers higher than the base spatial or quality layer, prior to creating an output video signal that is forwarded to the receiving endpoint.
wherein the conferencing server linked to the receiving endpoint and at least one transmitting endpoint is one of:
- a Transcoding Multipoint Control Unit using cascaded decoding and encoding;
- a Switching Multipoint Control Unit by selecting which input to transmit as output;
- a Scalable Video Communication Server using selective multiplexing; and
- a Compositing Scalable Video Communication Server using selective multiplexing and bitstream-level compositing.

20. The computer readable medium of claim 19, further comprising executable instructions to direct the processor to, at an encoder (including a combination of hardware and software) of the at least one transmitting endpoint, encode transmitted media as frames in a threaded coding structure having a number of different temporal levels, wherein a subset of the frames ("R") is particularly selected for reliable transport and includes at least the frames of the lowest temporal layer in the threaded coding structure so that the decoder can decode at least a portion of received media based on a reliably received frame of the type R after packet loss or error and thereafter is synchronized with the encoder, and wherein the conferencing server selectively eliminates portions of the input video signals received from transmitting endpoints that correspond to layers higher than the base spatial or quality layer in non-R frames only, prior to creating the output video signal that is forwarded to the receiving endpoint.

21. The computer readable medium of claim 19, further comprising executable instructions to direct the processor to, at the conferencing server control the transmission rate of the output video signal that is forwarded to the receiving endpoint so that the retained portions of the input video signals received from transmitting endpoints that correspond to layers higher than the base spatial or quality layer do not adversely affect the smoothness of an output bit rate.

22. The computer readable medium of claim 19, wherein the selective elimination by the conferencing server is performed according to desired output bit rate requirements.

23. The computer readable medium of claim 19 further comprising executable instructions to direct the processor to, at the decoder, display decoded output pictures at a desired spatial resolution that falls in between an immediately lower and an immediately higher spatial layer provided by the coded video signal.

24. The computer readable medium of claim 19 further comprising executable instructions to direct the processor to, at the decoder, operate a decoding loop of the immediately higher spatial layer at a desired spatial resolution by scaling all coded data of the immediately higher spatial layer to the desired spatial resolution, and wherein resultant drift is eliminated by using at least one of:
- periodic intra pictures;
- periodic use of intra base layer mode; and
- full resolution decoding of at least the lowest temporal layer of the immediately higher spatial layer.

25. The computer readable medium of claim 19, wherein the scalable video coding format includes at least one of:
- periodic intra pictures,
- periodic intra macroblocks, and
- threaded picture prediction,
- in order to avoid drift when the target layer's coded information that is lost or is not available corresponds to the base temporal layer.

26. The computer readable medium of claim 19, where the scalable video coding format is based on hybrid coding, the format comprising H.264, VC-1 or AVS standards, wherein the coded information from a spatial or quality layer lower than the target layer used by the decoder when some or all of the target layer's coded information is lost or is not available comprises at least one of:
- motion vector data, appropriately scaled for the target layer's resolution;
- coded prediction error difference, upsampled to the target layer's resolution; and
- intra data, upsampled to the target layer's resolution,
- further comprising executable instructions to direct the processor to, at the decoder, use the target layer's decoded pictures as references in the decoding process in order to construct decoded output pictures, rather that the lower layer decoded reference pictures.

27. The computer readable medium of claim 19 further comprising executable instructions to direct the processor to, at the decoder, operate at least one decoding loop for spatial or quality layers higher than the target spatial or quality layer for at least the base temporal layer, so that when the decoder switches target layers it can immediately display decoded pictures at the new target layer resolution.

* * * * *